United States Patent [19]

Baldyga

[11] 4,033,804

[45] July 5, 1977

[54] RECLAIMING WASTE PLASTICS

[75] Inventor: Eugene P. Baldyga, Springfield, Mass.

[73] Assignee: Monsanto Company, St. Louis, Mo.

[22] Filed: July 7, 1975

[21] Appl. No.: 593,545

[52] U.S. Cl. .................................. 156/84; 156/153; 156/344; 264/37; 264/140; 264/230; 264/DIG. 69; 264/DIG. 71

[51] Int. Cl.² .................. B29C 29/00; B32B 35/00

[58] Field of Search ............ 264/37, 140, 115, 230, 264/DIG. 69, DIG. 71, 342 R; 156/247, 344, 85, 86, 153, 154, 250, 84

[56] References Cited

UNITED STATES PATENTS

| | | | |
|---|---|---|---|
| 3,317,642 | 5/1967 | Bailey | 264/230 |
| 3,662,453 | 5/1972 | Meal et al. | 156/344 X |
| 3,870,181 | 3/1975 | Sincock | 215/1 C |

FOREIGN PATENTS OR APPLICATIONS 545,739   9/1957   Canada .............................. 264/230

OTHER PUBLICATIONS

Bureau of Mines Report of Investigations, 1974, entitled "Recycling of Plastics from Urban and Industrial Refuse".
Business Week, Apr. 6, 1975, pp. 50A, 50B, and 50C, entitled "Soft Drinks Finally Get an All-Plastic Bottle".

Primary Examiner—Jan H. Silbaugh
Attorney, Agent, or Firm—Michael J. Murphy

[57] ABSTRACT

Molecular orientation stress is relieved in thermoplastic articles being prepared for reclaiming in order to shrink the article and decrease volume. Shrinkage is sufficient to cause separation of labels when the latter are present. When the articles are containers, each shrunk-back mass has the appearance of an individual, grotesquely distorted container, which, because of its reduced volume, is especially useful as feedstock to a reclamation system.

11 Claims, 6 Drawing Figures

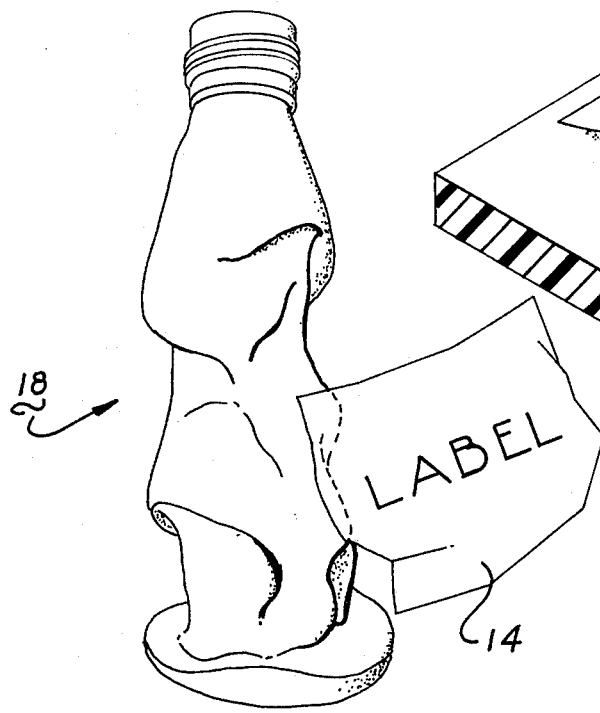
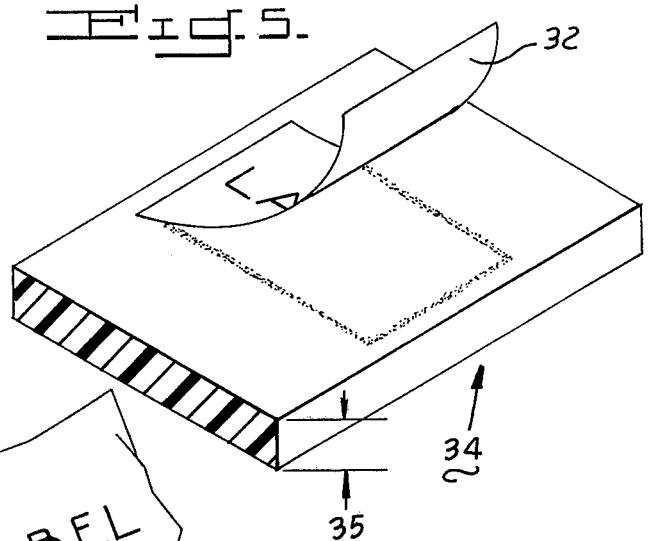
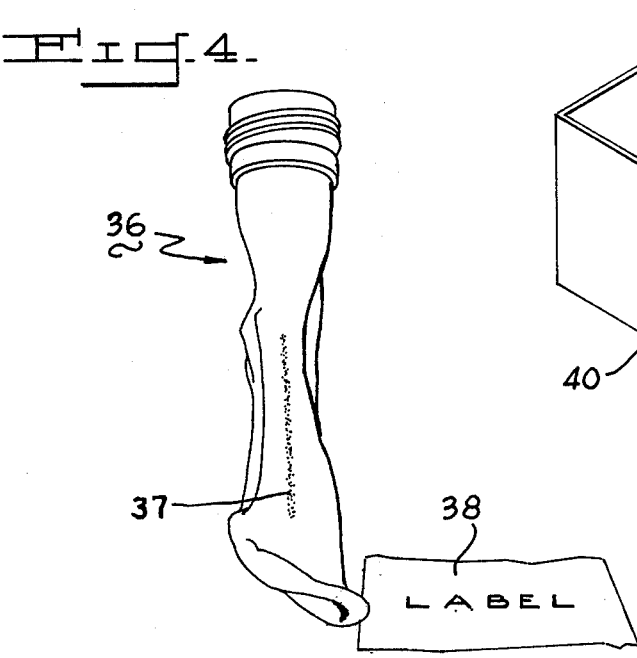
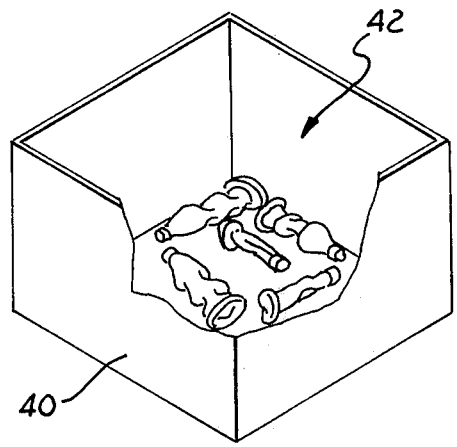

RECLAIMING WASTE PLASTICS

BACKGROUND OF THE INVENTION

This invention relates to reclaiming waste plastics and more particularly to process and product improvements applicable to such reclamation.

As set forth, for example, in United States Bureau Of Mines Report Of Investigations 7955, entitled "Recycling Of Plastics From Urban And Industrial Refuse", 1974, it is known to reclaim waste plastics for refabrication into similar or different products, or for pyrolysis to recover monomers forming the thermoplastic material, or for incineration where the plastics serve as a high-energy fuel source.

Molecularly oriented articles such as sheet, film, bags, containers in the form of trays, bottles, cups and the like have been increasingly appearing in the marketplace and represent candidates for reclamation. Such orientation is employed to improve strength, thereby facilitating a reduction in the plastic used over that necessary in non-molecularly oriented articles of equal strength. Generally, such orientation involves stretching the thermoplastic material while within a pre-selected temperature range in plural (usually two) directions during fabrication in order to orderly align the molecules in the direction of stretch, followed by quenching while under stress to lock in the orientation. One category of molecularly oriented articles having major, though not exclusive, application in food and beverage packaging are containers such as bottles, formed of high barrier thermoplastic materials, i.e., those having respective oxygen and carbon dioxide permeabilities of less than 20 and 30 cc./day/100 sq.in.-/mil./atm. at 73° F., and it is especially desirable to recover such containers in view of the rather expensive nature of these high barrier materials.

In general, reclaiming usually involves grinding the waste articles to reduce size, segregating the various types of different materials from each other before or after such grinding, optionally followed by washing prior to either recycling for refabrication, or pyrolysis for monomer recovery, or incineration for energy recovery. When the collected articles are labeled, as is frequently the case with packaged products, the lables must be separated in the recovery process, usually during washing, in order to avoid contamination of the purified resin. Label removal can present problems, usually because of the rather tenacious adherence of the label material to the article surface via adhesives which do not readily dissolve or may even be completely insoluble in conventional liquids otherwise suitable for washing the plastics.

SUMMARY OF THE INVENTION

Now, feedstock improvements have been developed for plastics reclaiming systems, as well as improvements in delabeling molecularly oriented articles to be processed in such systems.

Accordingly, it is a principal object of this invention to provide process improvements in reclaiming, e.g., recycling, molecularly oriented thermoplastic articles.

Another object is to provide process improvements to facilitate delabeling molecularly oriented articles formed of thermoplastic material.

A further object is to provide an improved feedstock for a plastics reclamation system.

A specific object is to provide such process and feedstock improvements particularly applicable to recovery of high barrier, molecularly oriented thermoplastic articles.

Other objects will in part be obvious and will in part appear hereinafter from the following description and claims.

These and other objects are accomplished in a process for delabeling molecularly oriented thermoplastic articles by providing the step or relieving orientation stresses beneath the label sufficiently to cause enough shrinkage for the thermoplastic material and label to separate.

From a product standpoint, a useful article of feed to a plastics reclaim system is provided comprising a distorted, unground, shrunk-back shape formed of thermoplastic material.

Also provided in a plastics reclaiming process, which includes grinding used thermoplastic containers to form particulate material for further processing, is the improvement wherein such containers are molecularly oriented and including the step of heating such containers to at least about the glass transition temperature range of the thermoplastic material prior to grinding to relieve molecular orientation stresses therein.

BRIEF DESCRIPTION OF THE DRAWINGS

In describing the overall invention, reference will be made to the accompanying drawings wherein:

FIGS. 3, 4 and 5 are views similar to FIGS. 1 and 2 of the articles after completion of the steps of FIGS. 1 and 2; and FIG. 6 is a schematic view of the reclamation system feedstock of the invention.

DETAILED DESCRIPTION OF ILLUSTRATED EMBODIMENTS

Figure 1:
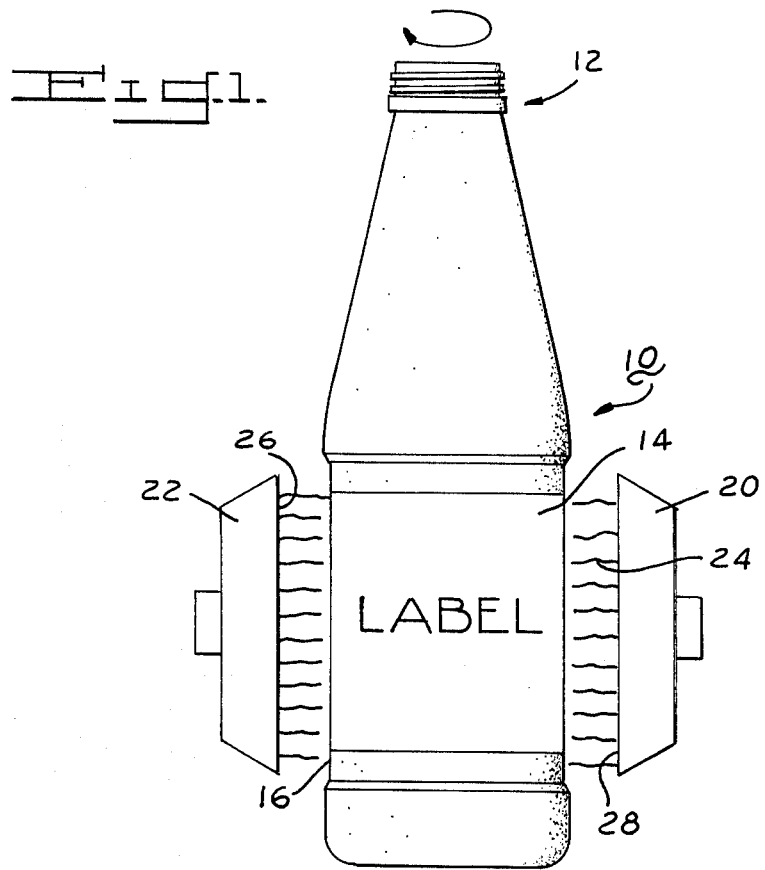
FIGS. 1 and 2 are schematic views showing the improved process step of the invention.

Referring now to the drawings, a bottle 10 intended for reclaiming, or for recycling for refabrication into the same or different article(s) is illustrated in FIG. 1. Though shape may vary widely from that shown, bottle 10 is cylindrical in axial cross section and is formed of a thermoplastic material, preferably, though not necessarily, non-cellular, which has been molecularly oriented during fabrication, at least along a portion of the article body below neck 12. Lable 14 is secured thereto via spaced vertical layers of a suitable adhesive extent between the bottle outer surface and the underside of the label at spaced intervals along cylindrical portion 16. Bottle 10 may vary widely in weight, but the process step to be described has been used sucessfully with sizes conventionally used to package household products such as foodstuffs, medicines, beverages and the like, weighing between about 5 to 180 grams when empty.

In accordance with the invention, molecularly oriented bottle 10 is delabeled by relieving the orientation stresses in the plastic beneath label 14 sufficiently to cause enough shrinkage for the thermoplastic material and label to separate. Specifically, shrinkage results in a contraction or pulling away of the stressed, resilient material from the label, and with respect to the shape of FIG. 1, produces, depending on the extent of heat treatment, distorted, unground shrunk-back shape 18 of FIG. 3. Stress relieving is accomplished by heating the material to a temperature sufficient to relax same, such as to at least about the glass transition temperature range of the thermoplastic material forming bottle 10 in the area where the label exits. If heating is to temperatures above such range, the time necessary to accomplish a given amount of shrink-back is reduced in comparison with that necessary for lower temperatures. Such glass transition temperature range of a thermoplastic material is known in the art and is defined as that relatively brief temperature span at which the shear modulus of the material changes by at least an order of magnitude in comparison with the change above and below such range. This is more fully described, for example, in "Properties and Structures of Polymers" by Arthur V. Tobolsky, John Wiley and Sons Inc., 1960. Heating may be accomplished in any conventional manner, such as for example, via infrared heaters 20 and 22 emitting infrared heat schematically illustrated at 24, from surfaces 26 and 28. After initial disengagement, complete removal of labels 32 (FIG. 2) and 14 to the extent illustrated in FIGS. 3 and 5, is relatively easy and may be done quite readily either by hand or via a suitable stripping mechanism — e.g. an air blast.

The extent of shrinkage adequate to separate labels secured to most articles via conventional adhesives will vary but may constitute a reduction of as little as about 5% and preferably from about 25 to 125% of the surface area of the labeled article. The resultant shrunk-back article may have a small, residual amount of the label adhesive remaining on its outer surface, such as illustrated at 37 in FIG. 4. When the adhesive is polymeric in nature, the applied heat tends to soften the polymer sufficiently to facilitate separation, and it may even cause separation of much of the polymeric adhesive per se from the article surface. In this last respect it has been noticed that in removing a label by the technique of the invention, most of a polymeric adhesive used balled up under the influence of the heat and wound up completely separated from the article along with the label on the base surface of a heating oven. Much of the adhesive also comes off with the label itself since it had been soaked into the label proper during initial application. The residual quantity 37 of adhesive left on the article surface can be so insignificant when the article material is added back to a master batch during a subsequent refabrication step as to have little or no affect on reprocessing.

If it is desired to use the invention to completely remove a label from a molecularly oriented article, as opposed to substantially but not entirely so doing, as the latter is illustrated in FIG. 3, heat exposure is continued for a period sufficiently long to further reduce the article in size from that depicted in FIG. 3 to that shown at 36 in FIG. 4 wherein label 38, as indicated, has been completely separated therefrom. The difference between the shape of FIGS. 3 and 4 is achieved by merely extending the period of exposure of the initial article 10 to the disorienting heat.

Figure 2:
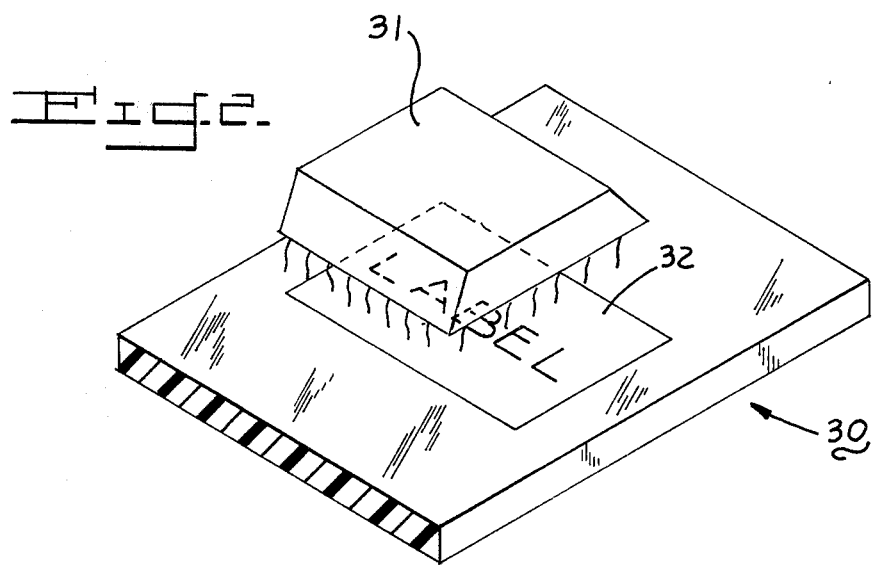

The label removal process of the invention is alternatively applicable to other articles such as substantially planar slab 30 in FIG. 2 of molecularly oriented plastic initially bearing label 32 similar to that of FIG. 1 on its surface. Heating as previously described results in a shrunk-back part 34 (FIG. 5) decreased in surface area and therefore increased in thickness from that of FIG. 2, and from which label 32 has been substantially removed.

As apparent from FIGS. 3, 4 and 5, the substantially increased bulk density of the shrunk-back distorted shapes over that extent initially render such shapes a rather useful feedstock for a plastics reclaim system. For example, volume reductions of from about 70 to 90% have been achieved, when the initial article is in the form of the stressed container shown in FIG. 1. A large number or multitude of substantially deoriented hollow articles substantially free of all appendages such as labels and having the individual appearance of grotesquely distorted, unground containers formed of thermoplastic material are schematically illustrated at 42 in FIG. 6 as contained in a suitable hopper 40. It should be understood that hollow articles 42 need not initially have borne labels, disorienting of unlabeled articles being useful per se as improving bulk density of the articles being recovered. In this respect, transport bulk is significantly reduced so as to make it economically advisable to use the invention in connection with returning waste articles from various collection points to a central reclamation center. Such increase in bulk density may also permit eliminating one of two successive size-reduction stages suggested in the prior art as necessary when the articles have a relatively substantial initial bulk. Feedstock 42 is intended for presentation to a conventional plastics reclaiming system which usually involves initial grinding to form particulate material for further processing according to systems known in the art.

Any article formed of thermoplastic material may be used in the present invention if it has been molecularly oriented to the extent that a reduction in surface area of at least about 5% thereof occurs on heating, for example to at least about the glass transition temperature range of the material. Materials particularly applicable for use with the present invention are high barrier polymers, as previously defined, such as those wherein a major proportion (at least 55 wt. %) is formed of a polymerized nitrile-group-containing monomer selected from the group consisting of acrylonitrile, methacrylonitrile and mixtures thereof. A particularly preferred such nitrile-group-containing monomer is acrylonitrile. Other high barrier materials particularly valuable for recovery include those based on polyethylene terephthalates wherein the polymer contains repeating ethylene terephthalate units of the formula:

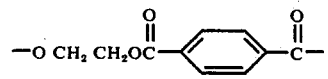

Alternatively useful thermoplastic materials include polymers and copolymers based on vinyl chloride, olefins such as ethylene and propylene, styrene and the like. Any comonomer compatible with those collectively mentioned above may be used.

EXAMPLE

A one quart bottle shaped as in FIG. 1 comprising a 70/30 weight percent acrylonitrile/styrene polymeric thermoplastic material was placed on a rotating turntable and hot air from a heat gun at a temperature above 500° F. was directed at the bottle surface, the glass transition temperature range of such thermoplastic material being approximately 230°–240° F. A paper label having an aluminum outer decorative layer had been secured to a cylindrical body portion of the bottle via a coating of a polymer-based adhesive adjacent each free vertical end of the rectangular label. After a period of about 30 seconds during which the bottle was rotated, the bottle was removed and was observed to have assumed the shape illustrated in FIG. 3, the label having been substantially removed as therein shown. After manually completing label removal, the distorted shape of FIG. 3 was determined to be ready for a single pass grinding step in a laboratory grinder to reduce the shape to a particulate form capable of presentation to the inlet of a conventional plastic reclamation system.

The above description and particularly the drawings are set forth for purposes of illustration only and are not to be taken in a limited sense. Various modifications and alterations will be readily suggested to persons skilled in the art. It is intended therefore, that the foregoing be considered as exemplary only and that the scope of the invention be ascertained from the following claims.

What is claimed is:

1. In a process for delabeling molecularly oriented thermoplastic articles having labels adhesively bonded to surface portions thereof, the step of relieving orientation stresses beneath the labels to the extent of reducing the surface area of such portions by at least about five percent, thereby causing the thermoplastic material and labels to separate.

2. The process of claim 1 wherein the article is heated to at least about the glass transition temperature range of the thermoplastic material.

3. The process of claim 1 wherein the article is a container.

4. The process of claim 3 wherein the container is a bottle.

5. The process of claim 3 wherein the thermoplastic material comprises a major portion of a polymerized nitrile-group-containing monomer.

6. The process of claim 3 wherein the thermoplastic material comprises a major portion of a polyolefin.

7. The process of claim 3 wherein the thermoplastic material comprises a major portion of polyethylene terephthalate.

8. In a plastics reclaim process which includes the step of:
    grinding used thermoplastic containers at a grinding station to form particulate material for further processing,
    the improvement wherein such containers are molecularly oriented and including steps comprising:
    heating such molecularly oriented containers at a heating station to at least about the glass transition temperature range of the thermoplastic material forming the containers prior to said grinding to relieve molecular orientation stresses therein and for a period sufficient to reduce the volume of such containers by about 70 to 90%; and
    transporting said containers from such heating station to said grinding station after said heating;
    whereby the transport bulk of such containers is substantially reduced as a result of such volume reduction.

9. The process of claim 8 wherein labels are separated from the containers as a result of shrinkage of the thermoplastic material during said stress relieving.

10. The process of claim 9 wherein the thermoplastic material comprises a high barrier resin.

11. The process of claim 10 wherein the high barrier resin comprises a major amount of polymerized acrylonitrile.

* * * * *